(12) United States Patent
Xu et al.

(10) Patent No.: US 7,865,715 B2
(45) Date of Patent: Jan. 4, 2011

(54) INCREASING PEER PRIVACY

(75) Inventors: Zhichen Xu, Sunnyvale, CA (US); Li Xiao, Williamsburg, VA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2875 days.

(21) Appl. No.: 10/084,499

(22) Filed: Feb. 28, 2002

(65) Prior Publication Data

US 2003/0163683 A1    Aug. 28, 2003

(51) Int. Cl.
*H04L 9/00* (2006.01)
(52) U.S. Cl. ...................................... 713/153
(58) Field of Classification Search .................. 713/153
See application file for complete search history.

(56) References Cited

U.S. PATENT DOCUMENTS

| | | | | |
|---|---|---|---|---|
| 5,862,223 | A * | 1/1999 | Walker et al. ................. | 705/50 |
| 6,266,704 | B1 * | 7/2001 | Reed et al. ................... | 709/238 |
| 6,460,036 | B1 * | 10/2002 | Herz ........................... | 707/10 |
| 6,813,354 | B1 * | 11/2004 | Jakobsson et al. ............. | 380/37 |
| 6,952,769 | B1 * | 10/2005 | Dubey et al. ................. | 713/153 |
| 7,010,604 | B1 * | 3/2006 | Munger et al. ............... | 709/227 |

OTHER PUBLICATIONS

Goldschlag et al., "Anonymous Connections and Onion Routing", May 1998, IEEE Journal on Selected Areas in Communication, vol. 16, No. 4.*
Claessens et al., "Solutions for Anonymous Communication on the Internet", 1999, IEEE ICCST.*
Clarke et al., "Freenet: A Distributed Anonymous Information Strorage and Retrieval System", 2000, Lecture Notes in Computer Science.*
Goldschlag et al., "Hiding Routing Information", May 1996, Workshop on Information Hiding.*
Goldschlag et al., "Onion Routing for Anonymous and Private Internet Connections", Feb. 1999, Communications of the ACM, vol. 42, No. 2.*
Goldschlag et al., "Onion Routing Access Configurations", Jan. 2000, DARPA Information Survivability Conference and Exposition, DISCEX '00. Proceedings, vol. 1, pp. 34-40.*

* cited by examiner

*Primary Examiner*—Matthew B Smithers
*Assistant Examiner*—Jeffery Williams

(57) ABSTRACT

In a method for increasing peer privacy, a path for information is formed from a provider to a requestor through a plurality of peers in response to a received request for the information. Each peer of the plurality of peers receives a respective set-up message comprising of a predetermined label and an identity of a next peer for the information. The information is transferred over the path in a message, where the message comprises a message label configured to determine a next peer according to the path in response to the message label matching the previously received predetermined label.

29 Claims, 11 Drawing Sheets

INCREASING PEER PRIVACY

FIELD OF THE INVENTION

This invention relates generally to network systems. More particularly, the invention relates to increasing peer privacy in a network system.

DESCRIPTION OF THE RELATED ART

A conventional system of peers (or network nodes) interconnected via a network provides a relatively convenient means of exchanging information between the peers. However, conventional network systems may be vulnerable to malicious users. For example, malicious users may determine the types of information stored at specific peers by monitoring the network traffic on the network. This may be problematic if one or more of the peers is a source of sensitive information.

Most existing anonymity techniques are for client/server models, which only hide the identities of the requestor (clients) from the servers. Some research addresses the problem of enforcing the mutual anonymity between a requestor and responder in a peer-to-peer ("P2P") environment. One technique to substantially increase privacy in a P2P network system is to configure each peer such that it only knows limited number of other peers. Accordingly, the identity of each peer is hidden from the other network nodes. However, this technique may suffer from some drawbacks and disadvantages. For instance, a peer may have to blindly broadcast its anonymous request for information to a large number of the peers. As a result, each peer receiving the request may search for the requested information. A majority of the peers may not have the requested information but are still required to process the request, and thereby, waste computational time.

Another technique to substantially increase privacy in a conventional network system is to use a trusted third party to hide the identity of the peer. However, this approach also has its own drawbacks and disadvantages. For example, the trusted third party may become a bottleneck for network traffic since the requests for information are funneled through the trusted third party. As a result, the overall performance of the conventional network system may be substantially reduced.

SUMMARY OF THE INVENTION

An embodiment of the present invention pertains to a method of increasing peer privacy. The method includes forming a path from a provider to a requestor by selecting a plurality of peers in response to receiving a request for information and updating a table on each peer of the plurality of peers with a respective path index entry for the information. The method also includes transmitting a message to the requestor through the plurality of peers, where the message comprises the information and a path index for the information from the provider. The method further includes determining a next peer according to the path for the information by searching the table of each peer of the plurality of peers with the path index as an index into the table.

Another embodiment of the present invention relates to a method of increasing peer privacy. The method includes updating a respective table of each peer of the plurality of peers with a respective path index entry in response to receiving a path formation message containing the respective path index entry and receiving a message comprising the information and a path index. The method also includes forwarding the information to a next peer in response to a determination of the next peer from the table with the path index as a search index into the table.

Yet another embodiment of the present invention pertains to a method for increasing privacy. The method includes selecting a path for information from a provider to a requestor through a plurality of peers in response to a received request for the information and receiving a respective set-up message at each peer of the plurality of peers, where the respective set-up message comprises a predetermined label and an identity of a next peer for the information according to the path.

Yet another embodiment of the present invention relates to a system. The system includes a plurality of peers, a network, a directory, and a peer privacy module. Each peer of the plurality of peers is capable of initiating, conducting and terminating a communication session. The network is configured to interconnect the plurality of peers and the directory is configured to interface with the network. The peer privacy module is configured to be executed by the directory. The peer privacy module is also configured to select a path for information from a provider to a requestor through a selected group of peers of the plurality of peers in response to a request from the requestor. The peer privacy module is further configured to transmit a plurality of set-up messages to respective peers of the selected group of peers over the network, where each set-up message includes a label and an identity of a next peer for the information based on the path.

Yet another embodiment of the present invention pertains to a system for increasing peer privacy. The system includes a plurality of peers, a network, a directory, and a peer privacy module. Each peer of the plurality of peers is capable of initiating, conducting and terminating a communication session. The network is configured to interconnect the plurality of peers. The directory configured to interface with the network, where the directory is also configured to transmit a plurality of setup-messages over the network based on a path for information requested from a provider to a requestor through a group of peers selected from the plurality of peers. The peer privacy module is configured to be executed by each peer of the plurality of peers, wherein the peer privacy module is adapted to receive a respective set-up message comprising of a label and an identity of a next peer according to the path.

Yet another embodiment of the present invention relates to a method of increasing peer privacy. The method includes forming a path for information from a provider to a requestor through a plurality of peers in response to a received request for the information and transmitting to each peer of the plurality of peers a respective set-up message comprising of a predetermined label and an identity of a next peer for the information. The method also includes transferring the information over the path in a message, where the message comprises a message label configured to determine a next peer according to the path in response to the message label matching a previously received predetermined label.

BRIEF DESCRIPTION OF THE DRAWINGS

Various features of the present invention can be more fully appreciated as the same become better understood with reference to the following detailed description of the present invention when considered in connection with the accompanying figures, in which.

DETAILED DESCRIPTION OF A PREFERRED EMBODIMENT

Figure 1:
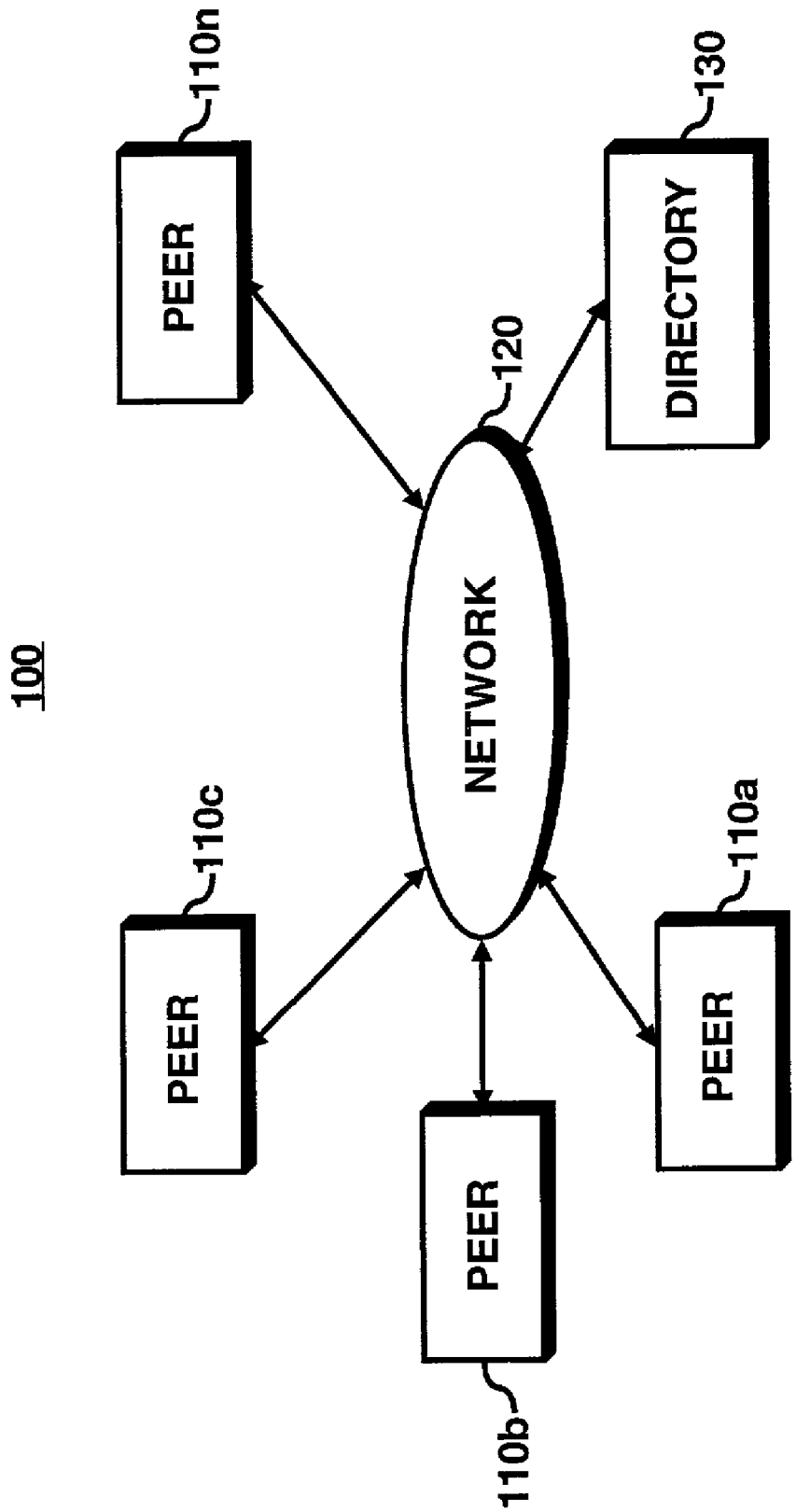
FIG. 1 illustrates an exemplary system where an embodiment of the invention may be practiced.

For simplicity and illustrative purposes, the principles of the present invention are described by referring mainly to an exemplary embodiment thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a peer privacy module is utilized to increase the privacy of peers exchanging information in a network system. The network system comprises a plurality of peers, a directory (i.e., a trusted-third-party), and a network providing a communication channel for the peers to communicate among the peers and the directory. A requestor peer may be configured to query the directory for information, where the query may take the form of a message (or packet, signal, etc.). The directory, acting as a trusted-third-party (i.e., configured not to reveal identities and/or modify information), may search an associated database for the availability of the requested information. If the information is available on a peer, a provider peer, in the plurality of peers, the directory may be configured to form a path based on a random selection (or other selection criteria known to those skilled in the art) of a sub-group of the peers, which includes the requestor as the last segment of the path.

The directory may also be configured to transmit a respective set-up message to each of the peers in the selected sub-group of peers for the requested information. Each set-up message may comprise a path index entry, which includes at least an individual predetermined label and an identity of a next peer according to the path. The path index entry may provide an approach for peers receiving messages to determine the next hop or segment for a particular received message.

Each peer receiving the set-up message may be configured to update a respective hash table with the received label and identity of the next peer for the information according to the path. More specifically, each peer may be configured to search the respective hash table for an existing entry. If an existing entry is not present, the hash table may be updated with the received label and the corresponding identity for the next peer according to the path. Otherwise, if there is an existing entry, the peer may be configured determine the next peer according to the path and to retrieve a previously stored message. The peer may also be configured to reformat the previously stored message with the received label encrypted with a public key of the next peer as the label for the message for transmission to the next peer.

The directory may be further configured to format a retrieval message for transmission over the network to the provider peer. The retrieval message may comprise an encryption key generated by the directory that is encrypted by a public key of the provider peer and encrypted again by a public key of the requestor peer. The retrieval message may also include a reference to the requested information, a label, and an identity of the first next peer from the provider peer according to the path, which are encrypted with the encryption key.

The provider peer may be configured to apply a complementary (or private) key to the public key to decrypt the encryption key encrypted with the public key of the provider peer. The provider peer may apply the encryption key to retrieve the reference for the requested information, the received label, and the identity of the first peer next to the provider peer according to the path selected by the directory. The provider peer may format a message for transmission to the requestor peer through the selected sub-group of peers according to the path. The message may include the information encrypted with the encryption key, the encryption key encrypted with the public key of the requestor peer, and the received label encrypted with the public key of the first peer as the label.

An intermediary peer along the path may be configured to forward the message to a next peer by determining the next peer by searching a hash table of the intermediary peer. More particularly, the intermediary peer may use the received label as a search index to search the hash table for the next peer in the path, i.e., the next hop, for the message. If an entry is found in the hash table, the identity of the next peer is retrieved. The message is reformatted with the received label encrypted with a public key of the identified next peer as the label, the encryption key encrypted with the public key of the requestor peer, and the information encrypted with the encryption key for transmission to the next peer. Otherwise, if an entry is not found in the hash table, the intermediary peer may be configured to update the hash table with the label and store the message.

Accordingly, a peer privacy module may be utilized to protect the identities of a requestor and provider of information. Moreover, the peer privacy module may increase the network system efficiency by setting up the path for information in parallel and having an intermediary peer encrypting and decrypting each piece of information once per hop for stronger anonymity.

FIG. 1 illustrates an exemplary block diagram of a system 100 where an embodiment of the present invention may be practiced. It should be readily apparent to those of ordinary skill in the art that the system 100 depicted in FIG. 1 represents a generalized schematic illustration and that other components may be added or existing components may be removed or modified without departing from the spirit or scope of the present invention.

As shown in FIG. 1, the system 100 includes a plurality of peers 110a . . . 110n. The peers 110a . . . 110n may be configured to exchange information among themselves and with other network nodes over a network 120. The peers 110a . . . 110n may also be configured to determine which peers 110a . . . 110n are valid. The peers 110a . . . 110n may be computing platforms (e.g., personal digital assistants, laptop computers, workstations, and other similar devices) that have a network interface. The peers 110a . . . 110n may each be further configured to execute an application software program that provides the capability to share information (e.g., files, data, applications, etc.) in a peer-to-peer manner. An example of a peer-to-peer software application is KAZAA, NAPSTER, MORPHEUS, or other similar peer-to-peer applications.

The network 120 may be configured to provide a communication channel among the peers 110a . . . 110n. The network 120 may be implemented as a local area network, wide area network or a combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or a combination thereof.

The system 100 may include a directory 130. The directory 130 (or trusted-third-party) may be implemented on a computing platform similar to the peers 110a . . . 110n. The directory 130 may be configured to be trustworthy, i.e., not to modify or change information routed therethrough.

According to an embodiment of the present invention, a user of the peer 110a, as a requestor, may request information (e.g., a file) from the peer 110n, as a data provider. The user of peer 110a may send a request for the selected information to the directory 130, which may be configured to determine if the selected information exists on the peer 110n. If the information is available on the peer 110n, a provider peer, the directory 130 may be configured to form a path based on a random selection of a sub-group of the peers, which includes the requestor peer, 110a, as the last segment of the path. The directory may also be configured to transmit a respective set-up message to each of the peers in the selected sub-group of peers. Each set-up message may comprise a path index entry, which includes an individual predetermined label and an identity of a next peer according to the path for the requested information.

The directory 130 may be further configured to generate an encryption key utilizing an encryption algorithm such as DES, El Gamal, etc. The directory 130 may be further configured to form a retrieval message that comprises the encryption key encrypted with a public key of peer 110n, the encryption key encrypted with a public key of peer 110a, a reference to the requested information encrypted with the generated encryption key, a label, and identity of a first peer next to the provider peer according to the path. The directory 130 may be further configured to transmit this message to the peer 110n functioning as the provider through intermediary peers according to the path.

When the message is received at peer 110n, the peer 110n may be configured to apply a complementary key to the encryption key encrypted with the public key of the peer 110n. The decrypted encryption key may be applied to the encrypted reference to the requested information embedded in the message. The peer 110n may retrieve the information and encrypt the retrieved information with the decrypted encryption key. The peer 110n may form a message for transmission to the first peer which may include the encryption key encrypted with the public key of the requestor peer, the received label encrypted with the public key of the first peer, and the information encrypted with the encryption key.

When the message is received at an intermediary peer, such as peer 110c, the intermediary peer 110c may be configured to forward the message to a next peer (e.g., peer 110b) by determining the next peer by searching the hash table (not shown) of the intermediary peer 110c. More particularly, the intermediary peer 110c may use the received label as a search index to search the hash table for the next peer to forward the message. If an entry is found in the hash table, the identity of the next peer is retrieved. The message is reformatted with the current label encrypted with a public key of the identified next peer as the label, the encryption key encrypted with the public key of the requestor peer, and the information encrypted with the encryption key for transmission to the next peer. Otherwise, if an entry is not found in the hash table, the intermediary peer 110c may be configured to update the hash table with the label and store the message.

Figure 2:
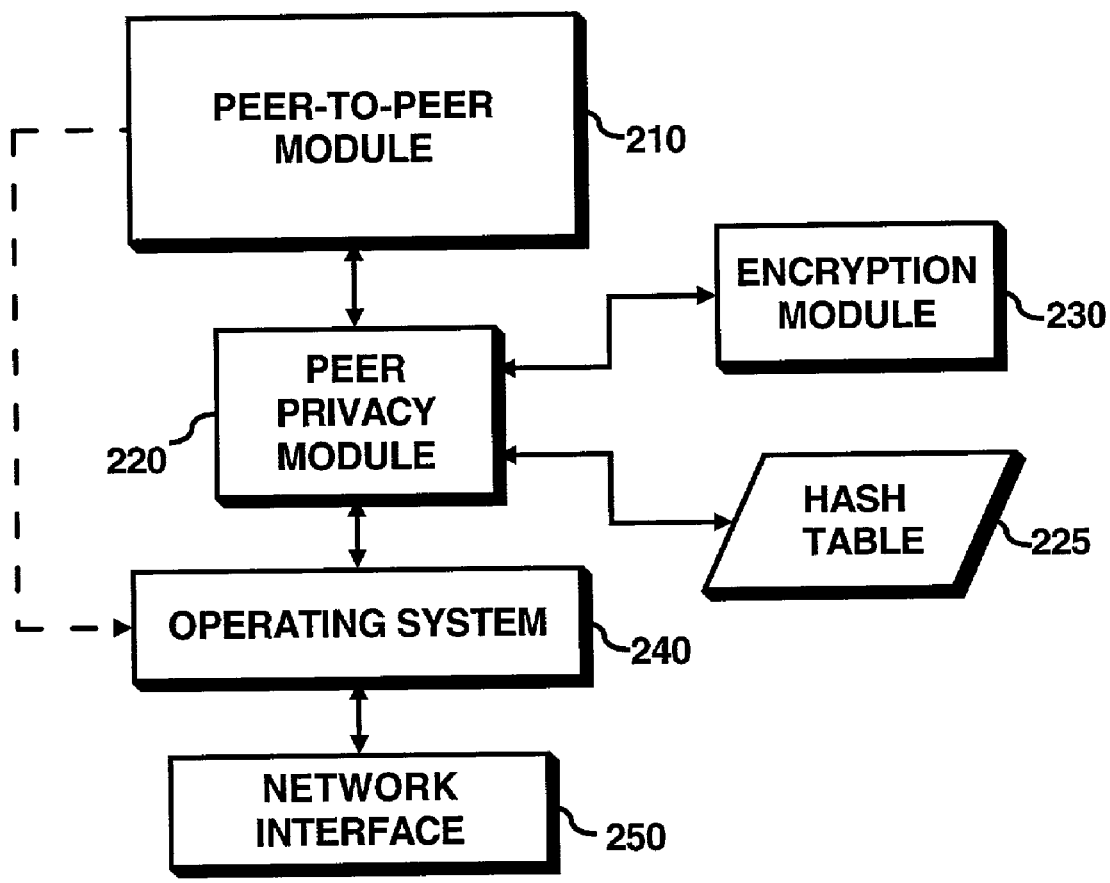
FIG. 2 illustrates an exemplary architecture for a peer in the system shown in FIG. 1.

FIG. 2 illustrates an exemplary architecture 200 for a peer in the system 100 shown in FIG. 1 in accordance with an embodiment of the present invention. It should be readily apparent to those of ordinary skill in the art that the architecture 200 depicted in FIG. 2 represents a generalized schematic illustration and that other components may be added or existing components may be removed or modified without departing from the spirit or scope of the present invention. Moreover, the architecture 200 may be implemented using software components, hardware components, or a combination thereof.

As shown in FIG. 2, the architecture 200 may include a peer-to-peer module 210, a peer privacy module 220, a hash table 225, an encryption module 230, an operating system 240 and a network interface 250.

The peer-to-peer module 210 may be configured to provide the capability to a user of a peer to share information with another peer, i.e., each peer may initiate a communication session with another peer. The peer-to-peer module 210 may also be configured to determine which peers are valid. The validity information of the other peers in the system 100 may be made available to the peer privacy module 220.

The peer-to-peer module 210 may be a commercial off-the-shelf application program, a customized software application or other similar computer program. The peer-to-peer module 210 may be implemented by such programs such as KAZAA, NAPSTER, MORPHEUS or other similar peer-to-peer applications. Alternatively, the peer-to-peer module 210 may be configured to directly interface with the operating system 240.

The peer privacy module 220 may be configured to monitor an interface between the peer-to-peer module 210 and the operating system 240. The peer privacy module 220 may also be configured to substantially protect the identity of the peer when the peer requests information from another peer by utilizing the peer-to-peer module 210. More specifically, the peer privacy module 220 may send a message to a trusted-third-party such as the directory 130 shown in FIG. 1. If the directory 130 determines that the information is available in a peer, the directory 130 may send a retrieval message to the provider peer.

In one embodiment of the invention, the peer privacy module 220 may be configured to receive a retrieval message from the directory 130. The retrieval message may include an encryption key encrypted with the public key of the provider peer, an encrypted reference, the same encryption key encrypted with the public key of the requestor peer, a label, and an identity of a first peer next to the provider peer according to the path.

The peer privacy module 220 may be configured to apply a complementary (or private) key to the public key to decrypt the encryption key encrypted with the public key of the provider peer. The peer privacy module 220 may apply the encryption key to retrieve the reference for the requested information, the received label, and the identity of the first peer next to the provider peer according to the path. The peer privacy module 220 may format a message for transmission to the requestor peer through the selected sub-group of peers according to the path. The message may include information encrypted with the encryption key, the encryption key encrypted with the public key of the requestor peer, and the received label encrypted with the public key of the first peer next to the provider peer as the label.

In another embodiment, the peer privacy module 220 may be configured to receive a set-up message from a trusted-third-party such as directory 130. The set-up message may be configured to inform the peer privacy module 220 the identity of the next peer for the information according to the path selected by the directory 130. The set-up message may include a path index entry, which comprises an individual predetermined label and a corresponding next peer. More specifically, the predetermined label may be generated for each peer by the directory 130 to determine the next hop for the information according to the path selected by the directory 130. Accordingly, as the information in a message traverses the path from the requestor, an intermediary peer may use a received label in the message as a search index into the hash table 225 to determine the next hop for the information.

The peer privacy module 220 may be configured to search the hash table 225 for an existing entry matching the received current label. If an existing entry is not present, the hash table 225 may be updated with the label and the corresponding identity for the next peer according to the path. Otherwise, if there is an existing entry, the peer privacy module 220 may be configured determine the next peer according to the path and to retrieve a previously stored message. The peer privacy module 220 may also be configured to reformat the previously stored message with the received label encrypted with a public key of the next peer as the label for the message for transmission to the next peer.

In accordance with another embodiment of the present invention, the peer privacy module 220 may be configured to forward a received message to a next peer by determining the next peer by searching the hash table 225. More particularly, the peer privacy module 220 may use the received label as a search index to search the hash table 225. If an entry is found in the hash table 225, the identity of the next peer is retrieved. The message is reformatted with the current label encrypted with a public key of the identified next peer as the label, the encryption key encrypted with the public key of the requestor peer, and the information encrypted with the encryption key for transmission to the next peer. Otherwise, if an entry is not found in the hash table 225, the peer privacy module 220 may be configured to update the hash table 225 with the label and store the message.

If the identity of the next peer is determined to be the requestor peer, the peer privacy module 220 may be configured to apply a complementary key to its public key to the encryption key encrypted with the public key of the requestor peer. The peer privacy module 220 may also be configured to apply the encryption key to the encrypted information to retrieve the requested information.

The hash table 225 may be configured to provide an identity of the next peer in a selected path for requested information based on a label. The hash table 225 may be implemented as a look-up table, linked list, or similar referencing tool. The hash table 225 may be stored and updated in a data storage device of the respective peer.

The peer privacy module 220 may be implemented as a software program, a utility, a subroutine, or other similar programming entity. In this respect, the peer privacy module 220 may be implemented using software languages such as C, C++, JAVA, etc. Alternatively, the peer privacy module 220 may be implemented as an electronic device utilizing an application specific integrated circuit, discrete components, solid-state components or a combination thereof.

The peer privacy module 220 may be further configured to interface with an encryption module 230. The encryption module 230 may be configured to provide encryption and decryption services to the peer privacy module 220. For example, the encryption module 230 may generate encryption keys, decrypt encrypted information, etc. The encryption module 230 may use asymmetric or symmetric encryption algorithms. Each peer privacy module 220 may have an encryption key pair, a public and private (or complementary) key. The public key is distributed to the other peers including the directory 130. When the other peers and/or directory 130 require a secure means of transferring information to the peer privacy module 220, they may encrypt the information with the public key. The peer privacy module 220 may use the private key to decrypt the encrypted information, thus substantially increasing security for information exchanges.

The peer privacy module 220 may be further configured to interface with the operating system 240. More specifically, the peer privacy module 220 may be interfaced with the operating system 240 through an application program interface (API, not shown). The operating system 240 may be configured to manage the software applications, data and respective hardware components (e.g., displays, disk drives, etc.) of a peer. The MICROSOFT WINDOWS family of operating systems, UNIX, HEWLETT-PACKARD HP-UX, LINUX, RIM OS, and other similar operating systems may implement the operating system 240. Alternatively, the peer-to-peer module 210 may be directly interfaced with the operating system 240 where the peer privacy module 220 is monitoring the API.

The operating system 240 may be further configured to be coupled with the network interface 250 through a device driver (not shown). The network interface 250 may be configured to provide a communication port for the respective peer over the network 120 (shown in FIG. 1). The network interface 250 may be implemented using a network interface card, a wireless interface card or other similar input/output device.

Figure 3:
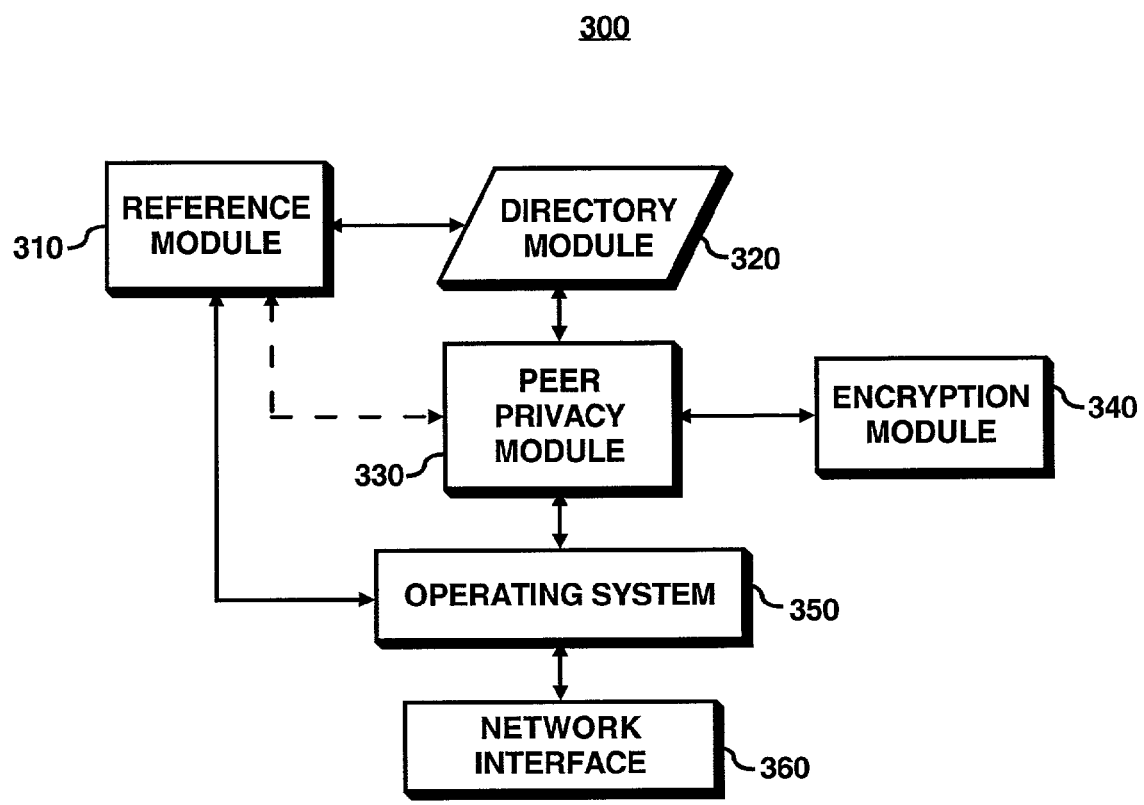
FIG. 3 illustrates an exemplary architecture for a directory in the system shown in FIG. 1.

FIG. 3 illustrates an exemplary architecture 300 for the directory 130 shown in FIG. 1 in accordance with an embodiment of the present invention. It should be readily apparent to those of ordinary skill in the art that the architecture 300 depicted in FIG. 3 represents a generalized schematic illustration and that other components may be added or existing components may be removed or modified without departing from the spirit or scope of the present invention. Moreover, the architecture 300 may be implemented using software components, hardware components, or a combination thereof.

As shown in FIG. 3, the architecture 300 may include a reference module 310, a directory module 320, a peer privacy module 330, an encryption module 340, an operating system 350, and a network interface 360. The reference module 310 may be configured to provide reference services for peers 110a . . . 110n in the network 120 through the operating system 350. The reference module 310 may periodically determine the types of information located within each peer of the data network system 100. The reference module 310 may also determine a location and/or existence of information (e.g., data, a file, etc.) in response to a request for information from a peer in the network 120.

The reference module 310 may be coupled to the directory module 320. The directory module 320 may be configured to provide database services for the reference module 310, i.e., provide the location of information among the peers 110a ... 110n. The directory module 320 may be implemented as a database, a file, etc., within the directory 130. Alternatively, a lightweight directory access protocol server (LDAP, not shown) may be configured to provide the database services for the reference module 310.

The peer privacy module 330 may receive a request for information from a peer such as one of the peers 110a ... 110n. If the peer privacy module 330 determines that a peer contains the requested information, the peer privacy module 330 may search a database for the availability of the requested information. If the information is available, the peer privacy module 330 may be configured to form a path based on a random selection (or other selection criteria known to those skilled in the art) of a sub-group of the peers, which includes the requestor as the last segment of the path.

The peer privacy module 330 may also be configured to transmit a respective set-up message to each of the peers in the selected sub-group of peers. Each set-up message may include a path index entry for the requested information, which comprises a label and an identity of a next peer according to the path.

The peer privacy module 330 may be further configured to format a retrieval message for transmission over the network to the provider peer. The retrieval message comprises an encryption key generated by the directory that is encrypted by a public key of the provider peer and encrypted again by a public key of the requestor peer. The retrieval message may also include a reference to the requested information, a label, and an identity of the first next peer from the provider peer according to the path, all encrypted with the encryption key.

The peer privacy module 330 may be implemented as a software program, a utility, a subroutine, or other similar programming entity. In this respect, the peer privacy module 330 may be implemented using software languages such as C, C++, JAVA, etc. Alternatively, the peer privacy module 330 may be implemented as an electronic device utilizing an application specific integrated circuit, discrete components, solid-state components or combination thereof.

The encryption module 340 may be configured to provide encryption and decryption services to the peer privacy module 330. For example, the encryption module 340 may generate encryption keys, decrypt encrypted information, etc. The encryption module 340 may use asymmetric, symmetric encryption algorithms or a combination thereof.

The peer privacy module 330 may be further configured to interface with the operating system 350. More specifically, the peer privacy module 330 may be interfaced with the operating system 350 through an application program interface (API, not shown). The operating system 350 may be configured to manage the software applications, data and respective hardware components (e.g., displays, disk drives, etc.) of a peer. MICROSOFT WINDOWS family of operating systems, UNIX, HEWLETT-PACKARD HP-UX, LINUX, RIM OS, and other similar operating systems may implement the operating system 350. Alternatively, the reference module 310 may be interfaced with the operating system 350 through the peer privacy module 330 or directly interfaced with the operating system 350.

The operating system 350 may be further configured to be coupled with the network interface 360 through a device driver (not shown). The network interface 360 may be configured to provide a communication port for the peer over the network 120 (shown in FIG. 1). The network interface 360 may be implemented using a network interface card, a wireless interface card or other similar input/output device.

Figure 4A:
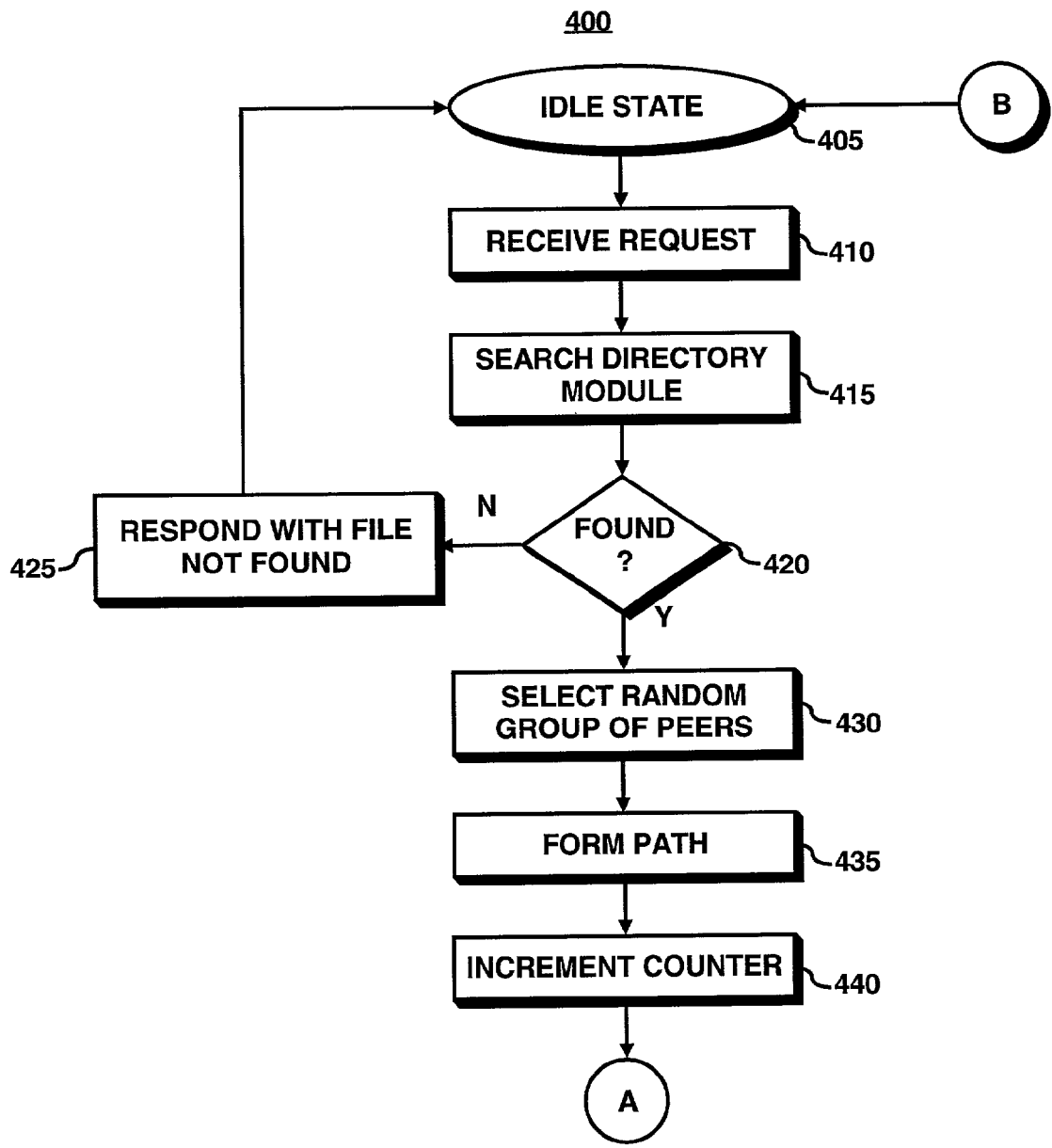
FIGS. 4A-B collectively illustrate an exemplary flow diagram according to an embodiment of the invention.
Figure 4B:
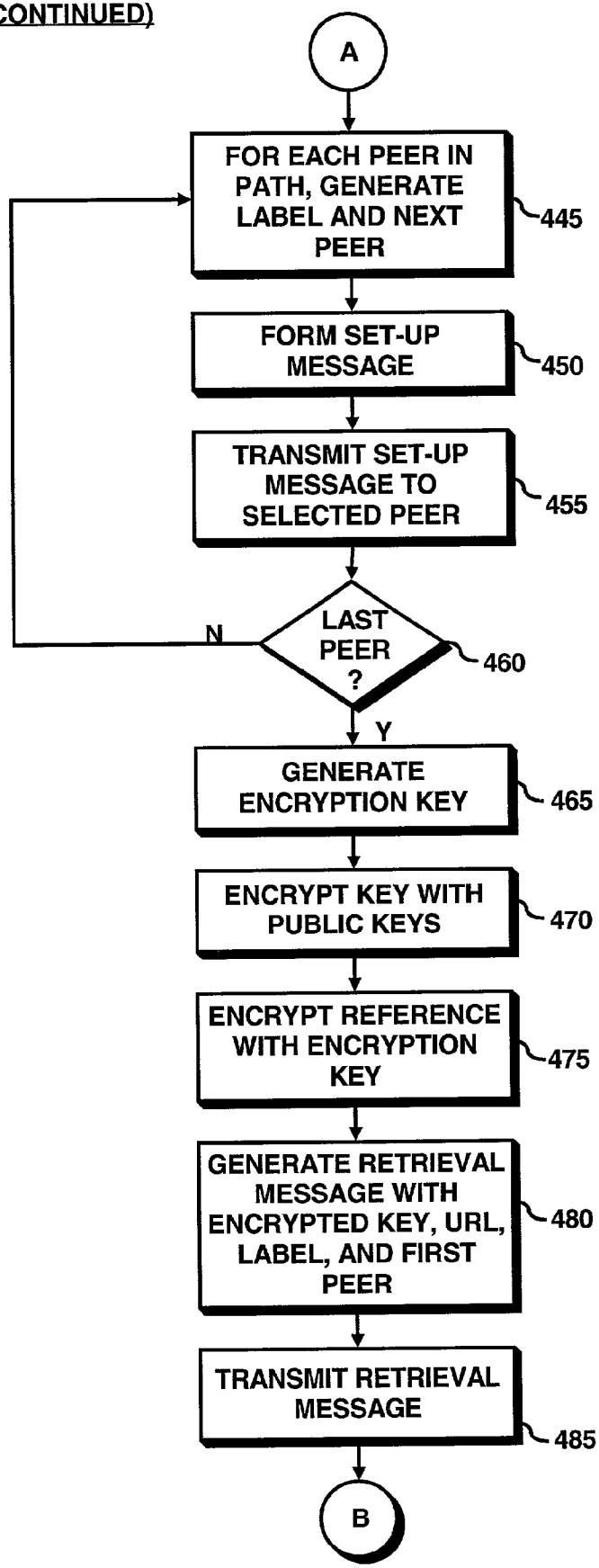

FIGS. 4A-4B collectively illustrate an exemplary flow diagram for an operational mode 400 of the peer privacy module 330 shown in FIG. 3 in accordance with an embodiment of the present invention. It should be readily apparent to those of ordinary skill in the art that the first operational mode 400 of the peer privacy module represents a generalized schematic illustration and that other steps may be added or existing steps may be removed or modified without departing from the spirit or scope of the present invention.

As shown in FIG. 4A, in step 405, the peer privacy module 330 of the directory 130 may be configured to be in an idle state. The peer privacy module 330 may receive a request for information (e.g., data, a file, etc.) from a requestor peer through the network interface 360, in step 410. The request may be in a format of a packet or message transmitted using the appropriate network protocol of the network 120.

In step 415, the peer privacy module 330 may be configured to search the directory module 320 for the requested information. The peer privacy module 330 may use the name of the requested information as an index into the directory module 320 to search for the peer(s) storing the requested information. Other techniques for querying information may be implemented and are within the scope of the present invention.

If the peer privacy module 330 determines that the requested information is not available on a peer in the system 100 (shown in FIG. 1), in step 420, the peer privacy module 330 may be configured to transmit a message to the requestor peer that the requested information is not available, in step 425. Subsequently, the peer privacy module 330 may be configured to return to an idle state of step 405.

Otherwise, returning to step 420, if the peer privacy module 330 determines that the requested information is available on a peer, the peer privacy module 330 may be configured to select a random group of peers from the peers 110a ... 110n, in step 430. The selected group of peers is configured to provide an anonymous path from the provider peer to the requestor peer. The number peers in the selected group of peers may vary from instance to instance.

In step 435, once the selected group of peers is formed, the peer privacy module 330 may be configured to form a path through the selected group of peers, where the requestor peer and the provider peer are the respective ends of the path with the selected group of peers forming the intermediate segments of the path, i.e., the intermediary peers.

In step 440, the peer privacy module 330 may be configured to increment a message counter. The message counter may be configured to give a tracking number, or transaction identifier, for the requested information. The message counter may be implemented as a software subroutine, a hardware device or instantiate a counter in the operating system 240.

With reference to FIG. 4B, in step 445, the peer privacy module 330 may be configured to form a set-up message for each peer in the path. For a current peer in the path, the peer privacy module 330 may be configured to generate a pair of path information items, a tuple, comprising a label and a next peer, i.e., <label($p_i$), $p_{i+1}$> such that label for the next peer according to the path may be current label of the current peer encrypted with the public key of the peer next to the current peer, i.e., label($p_{i+1}$)={label($p_i$)}$K_{pu}p_{i+1}$. The label may be any type of identifying indicia to associate with the requested information. In one embodiment of the present invention, the label may be the value of the message counter.

In another embodiment of the present invention, the label may be generated using the selected group of peers ($p_i$, for $0<=i<=k$, where k is the number of peers in the path) and a second selected group of peers, an index set of peers ($p_{ji}$). The label for a current peer, $p_i$, may be generated according to equation 1:

$$\text{label}(p_i) = \{\ldots \text{public}_{p_{ji+1}}(\ldots \text{public}_{p_{j0}}(n)\ldots)\} \quad (1)$$

In other words, the label for the current peer, $p_i$, may be generated by encrypting the label of the previous peer with the public key of the current index peer. Accordingly, to generate a label for the peer next to the current peer, $p_{i+1}$, the peer privacy module 330 may be configured to encrypt the current label with a public key of the next index peer.

In step 450, the peer privacy module 330 may be configured to form (or format) the set-up message with the appropriate label and the identity to a next peer according to the path. Subsequently, in step 455, the peer privacy module 330 may be configured to transmit the set-up message for the information based on the transaction identifier to the selected peer on the path.

In step 460, the peer privacy module 330 may be configured to determine if the last peer has been reached on the path. If the last peer on the path has not been reached, the peer privacy module 330 may be configured to return to the processing of step 445. If the last peer according to the path has been reached, the peer privacy module 330 may be configured to generate an encryption key. The encryption module 340 may use an algorithm such as DES encryption algorithm, El Gamal encryption or other similar encryption algorithms.

In step 470, the peer privacy module 330 may be configured to encrypt the encryption key with a public key of the requestor peer and with the public key of the provider peer to form two encrypted versions of the same encryption key.

In step 475, the peer privacy module 330 may be configured to apply the encryption key to a reference to the requested information in the provider peer by utilizing the encryption module 330. The reference may be a universal resource identifier (URI) such as a uniform resource locator.

In step 480, the peer privacy module 330 may be configured to form a retrieval message comprising of the encryption key encrypted with the public key of the requestor peer, the encryption key encrypted with the public key of the provider peer, the encrypted reference, and the current state of the label. As an example, the contents of the message may be depicted by equation 2, where $c_1$ represents the requestor peer and $c_2$ represents the provider peer:

$$\{\text{public}_{c_1}(D), D(\text{URL,label}), \text{public}_{c_2}(D)\} \quad (2)$$

In another embodiment of the present invention, the retrieval message may comprise the encryption key encrypted with the public key of the requestor peer, the encryption key encrypted with the public key of the provider peer, the value of the message counter encrypted with the encryption key, the reference to the information encrypted with the encryption key, and the first peer next to the provider peer and the associated first index peer both encrypted with the encryption key. As an example, the contents of the retrieval message may be represented by equation 3, where $c_1$ represents the requestor peer, $c_2$ represents the provider peer, n represents the value of the message counter, $b_0$ represents the first peer next to the provider, and $b_{j0}$ represents the index peer of the first peer:

$$\{\text{public}_{c_1}(D), D(\text{URL}, n, b_0, b_{j0}), \text{public}_{c_2}(D)\} \quad (3)$$

In step 485, the peer privacy module 330 may be configured to transmit the generated retrieval message to the provider peer over the network interface 360. Subsequently, the peer privacy module 330 may also be configured to return to the idle state of step 405 (shown in FIG. 4A).

Figure 5:
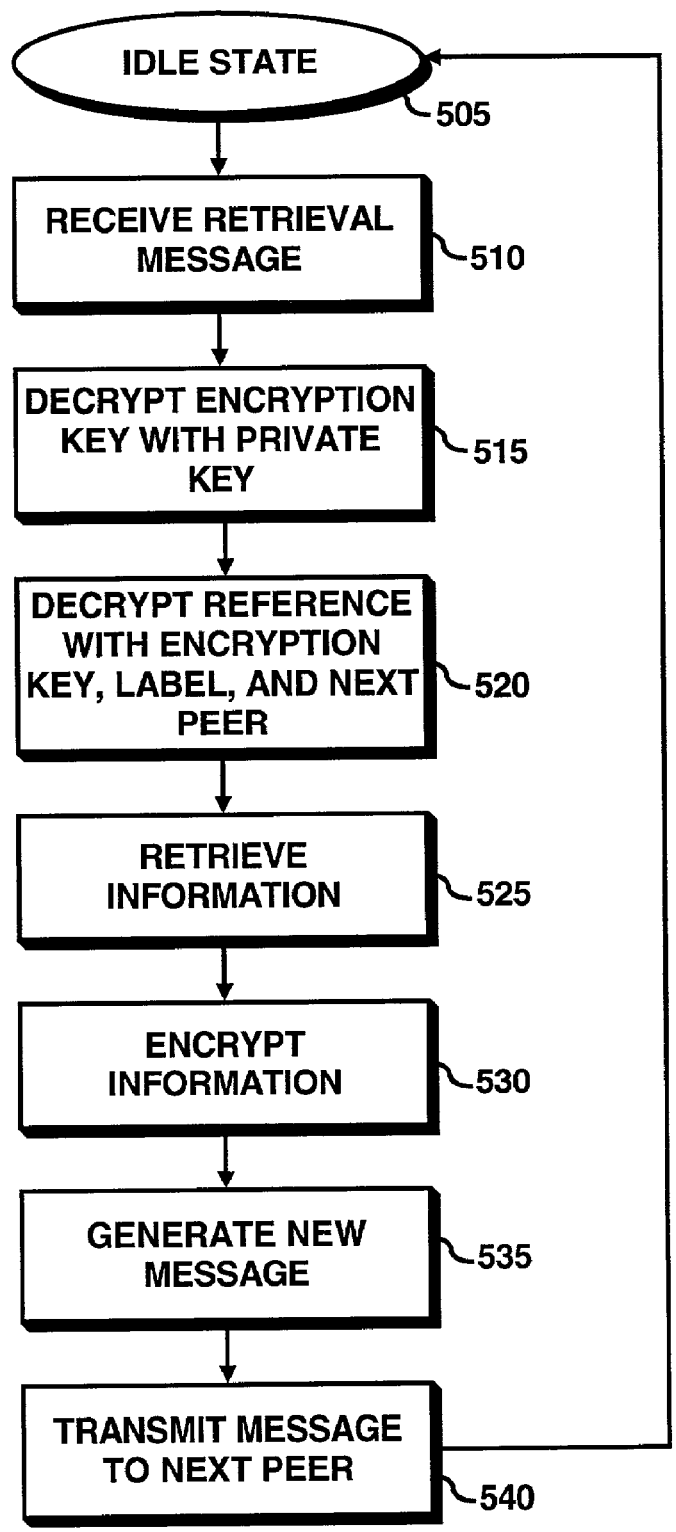
FIG. 5 illustrates an exemplary flow diagram according to another embodiment of the invention.

FIG. 5 illustrates an exemplary flow diagram for an operational mode 500 of the peer privacy module 220 shown in FIG. 2 in accordance with another embodiment of the present invention. It should be readily apparent to those of ordinary skill in the art that this operational mode of the peer privacy module 220 represents a generalized schematic illustration and that other steps may be added or existing steps may be removed or modified without departing from the spirit or scope of the present invention.

As shown in FIG. 5, the peer privacy module 220 may be configured to be in an idle state in step 505. The peer privacy module 220 may monitor the network interface 250 via the operating system 240 (shown in FIG. 2) for any received messages.

In step 510, the peer privacy module 220 may detect a retrieval message received through the network interface 250. The peer privacy module 220 may be configured to temporarily store the retrieval message for processing. As discussed herein above, the retrieval message may include two versions of an encryption key: the encryption key encrypted with the public key of the requestor peer as the first version and the encryption key again encrypted with the public key of the provider peer as the second version. The retrieval message may also include the reference to the requested information, the identity of the first peer next to the provider peer according to the path, and a label, where all three elements are encrypted with the encryption key.

In step 515, the peer privacy module 220 may be configured to decrypt the encryption key encrypted with the public key of the provider peer with a complementary key (or private key) to the public key, e.g., a private key, by utilizing the encryption module 230. The public key and the complementary key may be a public/private key pair generated using asymmetric or symmetric encryption algorithms.

In step 520, the peer privacy module 220 may be configured to apply the encryption key to the encrypted reference from the message to obtain the reference to the requested information. Subsequently, in step 525, the peer privacy module 220 may also be configured to retrieve the requested information (e.g., data, file, etc.) from a data storage device (not shown) accessible by the peer.

In step 530, the peer privacy module 220 may apply the encryption key to the retrieved information. In step 535, the peer privacy module 220 may be configured to generate a new message to be transmitted to the requestor peer through the selected group of peers according to the path provided by the directory 130. More particularly, the message may comprise the encryption key encrypted with the public key of the requestor peer, the encrypted information, and the current label. In one embodiment, the current label may be the value of the message counter encrypted with the public key of the peer next to the provider peer. In another embodiment, the current label may be the value of the message counter encrypted with the public key of the index peer associated with the first peer next to the provider peer according to the path. It should be readily apparent to those skilled in the art that the label may be identifying indicia.

In step 540, the peer privacy module 220 may be configured to transmit the generated message through the network interface 220 to the first peer next to the provider peer according to the path. Subsequently, the peer privacy module 220 may return to the idle state of step 505.

Figure 6A:
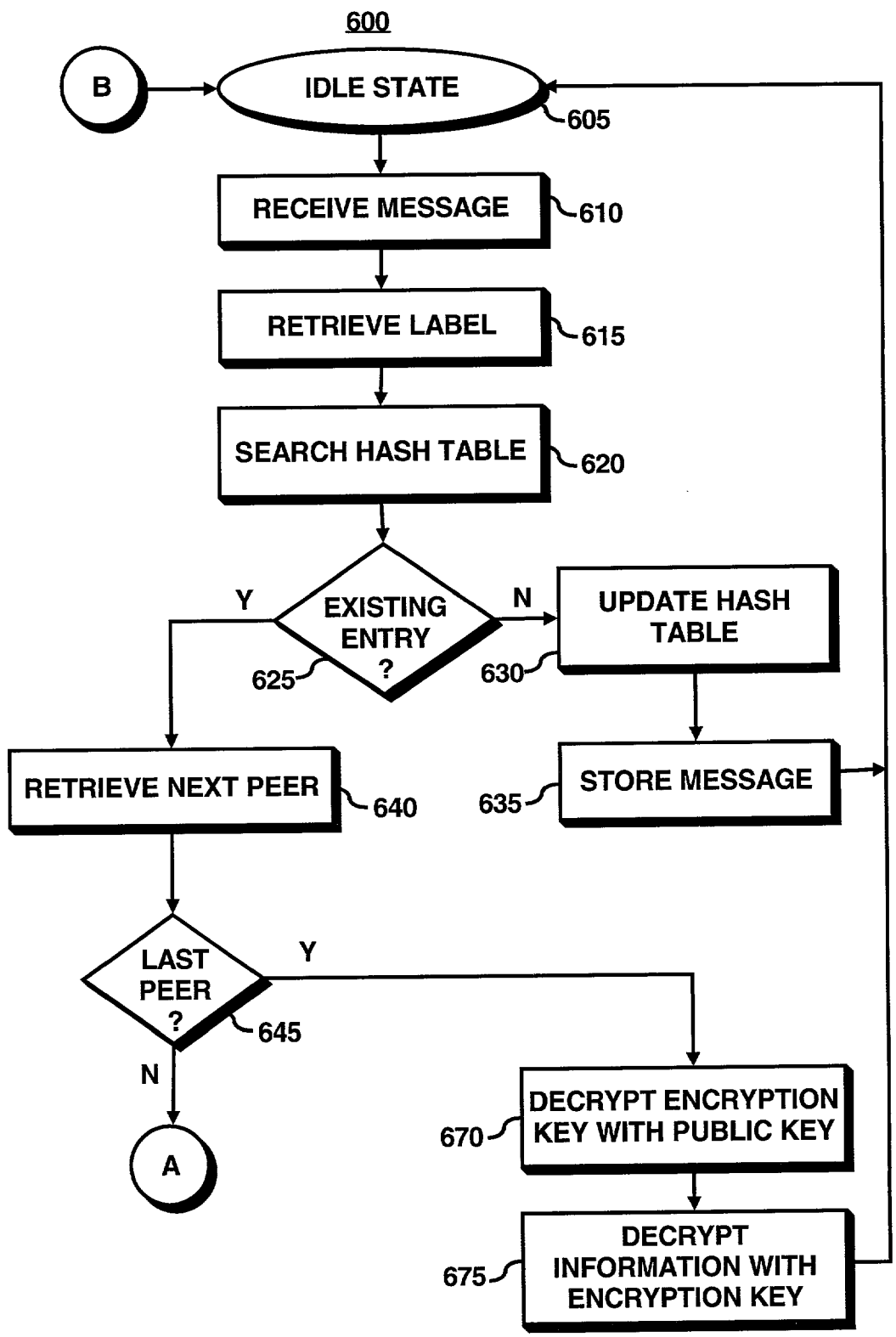
FIGS. 6A-B collectively illustrate an exemplary flow diagram according to yet another embodiment of the invention.

FIG. 6A illustrates an exemplary flow diagram for yet another operational mode 600 for the peer privacy module 220 shown in FIG. 2 in accordance with yet another embodiment of the present invention. It should be readily apparent to those of ordinary skill in the art that this operational mode of the peer privacy module 220 represents a generalized schematic illustration and that other steps may be added or existing steps may be removed or modified without departing from the spirit or scope of the present invention.

As shown in FIG. 6A, the peer privacy module 220 may be configured to be in an idle state in step 605. The peer privacy module 220 may monitor the network interface 250 via the operating system 240 (shown in FIG. 2) for any received messages.

In step 610, the peer privacy module 220 may detect a message received through the network interface 250. The peer privacy module 220 may be configured to temporarily store the message for processing. The message may include the encryption key encrypted with the public key of the requestor peer, the encrypted information, and the current label.

In step 615, the peer privacy module 220 may be configured to extract the current label from the received message and the corresponding identity of the next peer of the path for the requested information. Subsequently, in step 620, the peer privacy module 220 may be configured to search the hash table 225 with the label as a search index.

If the peer privacy module 220 determines that there is not an existing entry, in step 625, the peer privacy module 220 may be configured to update the hash table 225 with the entry and leaving the entry for the next peer blank, in step 630. The peer privacy module 220 may also be configured to store the message in a data storage device associated with the receiving peer, in step 635. Subsequently, the peer privacy module 220 may be configured to return to the idle state of step 605.

Otherwise, if the peer privacy module 220 determines that there is an existing entry in the hash table 225, the peer privacy module 220 may be configured to retrieve the next peer by matching the received label with the predetermined labels received from the directory 130, in step 640.

Figure 6B:
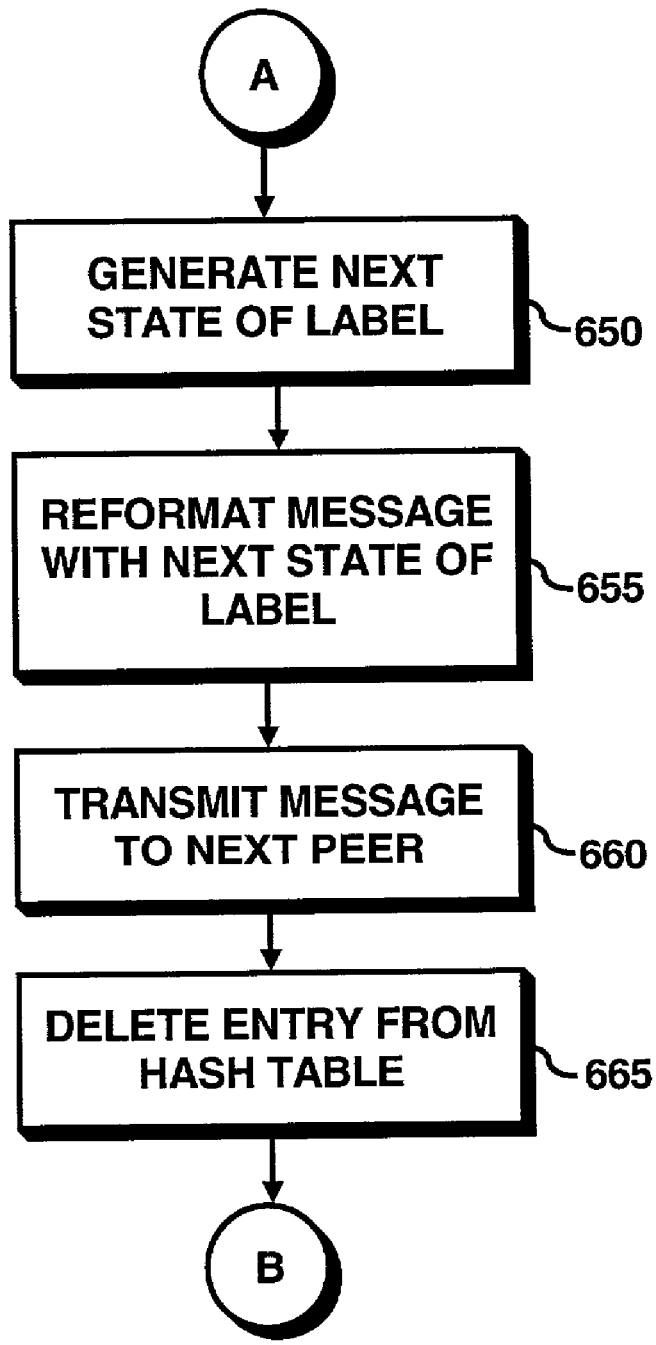

In step 645, the peer privacy module 220 may be configured to determine if the retrieved next peer matches the identity of the current peer. With reference to FIG. 6B, if the retrieved next peer does not match the current peer, the peer privacy module 220 may be configured to generate the next state of the received label, in step 650. More specifically, in one embodiment of the present invention, encrypting the label with the public key of the next peer may generate the next state of the received label. In another embodiment of the present invention, the next state of the received label may be generated by encrypting the received label with the public key of the respective index peer of the next peer.

In step 655, the peer privacy module 220 may be configured to reformat the received message with the next state of the label as the current label. Subsequently, in step 660, the peer privacy module 220 may transmit the reformatted message to the next peer.

In step 665, the peer privacy module 220 may be configured to delete the selected entry from the hash table 225. Subsequently, the peer privacy module 220 may return to the idle state of step 605.

Returning to FIG. 6A, if the peer privacy module 220 determines that the retrieved next peer matches the current peer, the matching condition may indicate that the last peer in the path has been reached. Accordingly, the peer privacy module 220 may be configured to apply a complementary key to the public key of the requestor peer to retrieve the encryption key, in step 670. In step 675, the peer privacy module 220 may be configured to apply the encryption key to the encrypted information to retrieve the requested information. Subsequently, the peer privacy module 220 may be configured to return to the idle state of step 605.

Figure 7A:
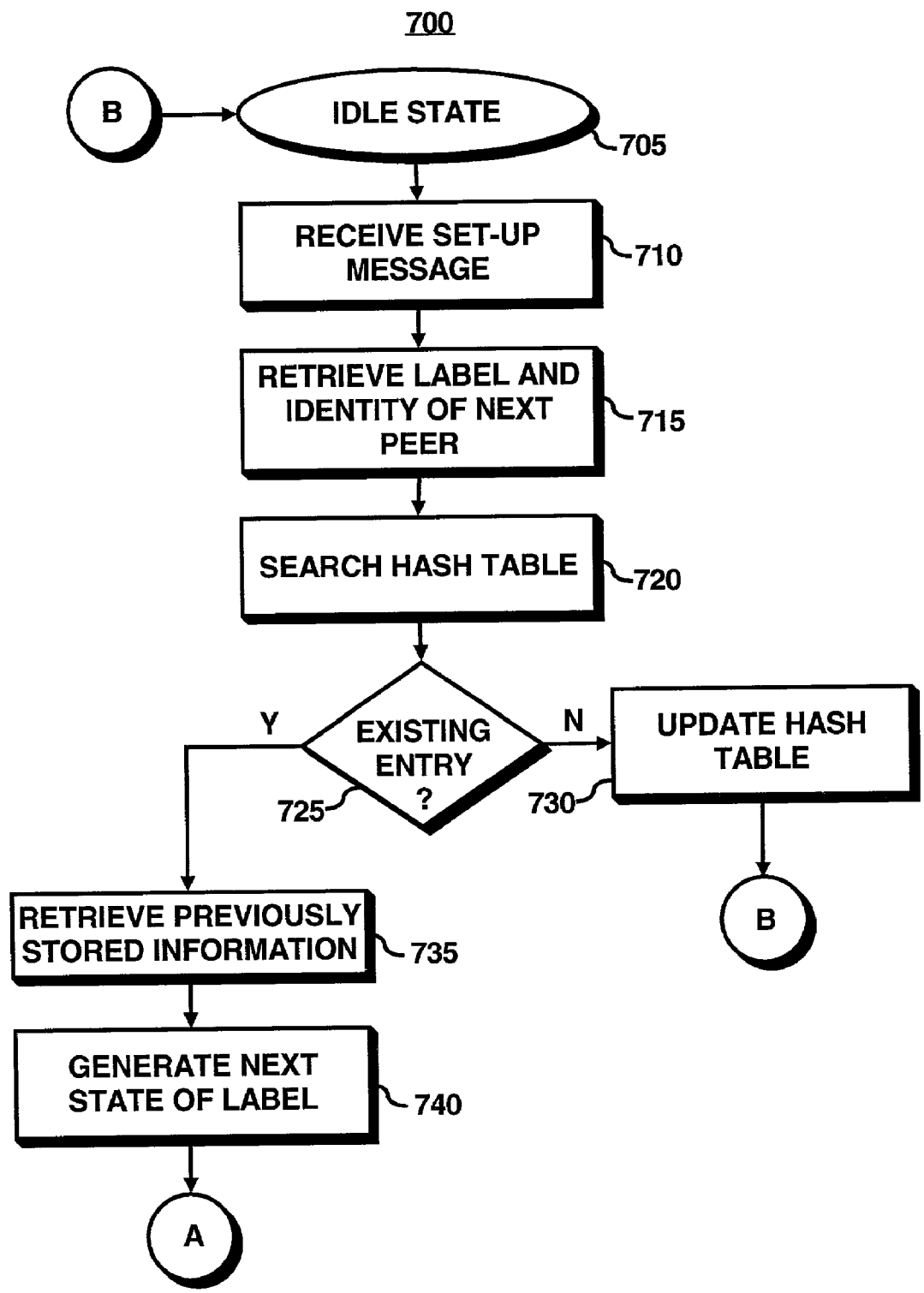
FIGS. 7A-B collectively illustrate an exemplary flow diagram according to yet another embodiment of the invention.
Figure 7B:
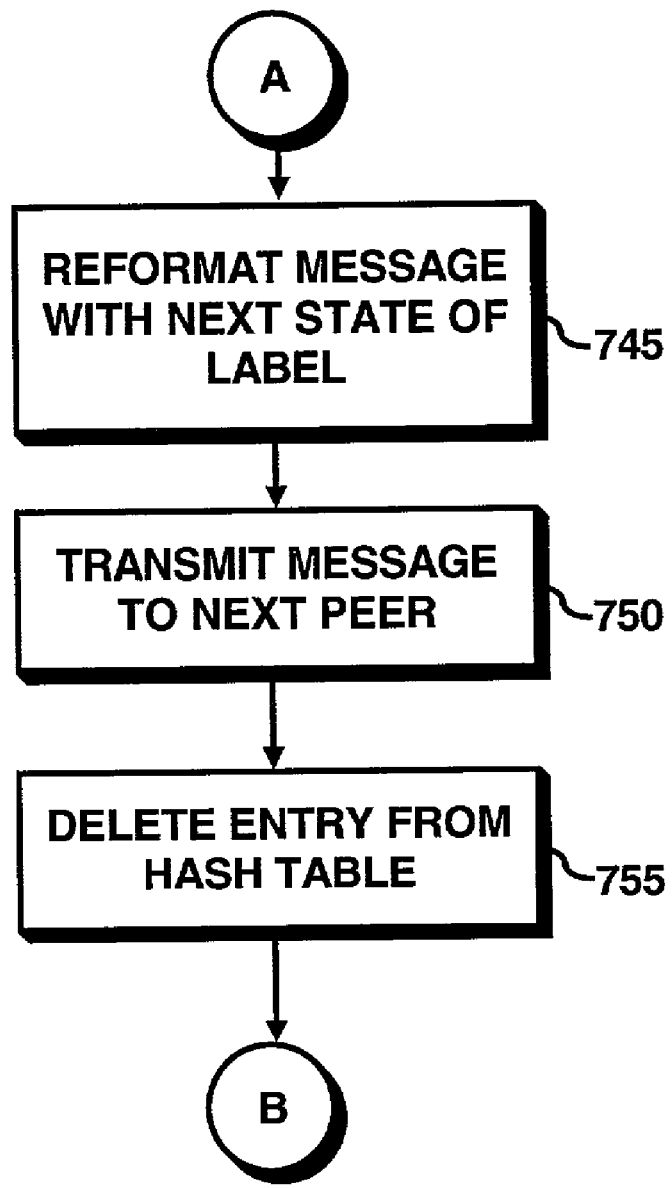

FIGS. 7A-B illustrate an exemplary flow diagram for yet another operational mode 700 for the peer privacy module 220 shown in FIG. 2 in accordance with yet another embodiment of the present invention. It should be readily apparent to those of ordinary skill in the art that this operational mode of the peer privacy module 220 represents a generalized schematic illustration and that other steps may be added or existing steps may be removed or modified without departing from the spirit or scope of the present invention.

As shown in FIG. 7A, the peer privacy module 220 may be configured to be in an idle state in step 705. The peer privacy module 220 may monitor the network interface 250 via the operating system 240 (shown in FIG. 2) for any received messages.

In step 710, the peer privacy module 220 may detect a set-up message received through the network interface 250. The peer privacy module 220 may be configured to temporarily store the set-up message for processing. The set-up message may include a label and an identity of a next peer for information to be transferred from a provider to a requestor.

In step 715, the peer privacy module 220 may be configured to extract the current label from the received message. Subsequently, in step 720, the peer privacy module 220 may be configured to search the hash table 225 with the label as a search index.

If the peer privacy module 220 determines that an existing entry is not present in the hash table 225, in step 725, the peer privacy module 220 may be configured to update the hash table 225 with the received label and corresponding identity of the next peer of the path for the requested information. Subsequently, the peer privacy module 220 may be configured to return to the idle state of step 705.

Otherwise, if the peer privacy module 220 determines that there is an existing entry in the hash table 225, the peer privacy module 220 may be configured to retrieve the previously stored message, in step 735. In step 740, the peer privacy module 220 may be configured to generate the next state of the received label in the set-up message. More particularly, in one embodiment of the present invention, encrypting the label with the public key of the next peer may generate the next state of the received label. In another embodiment of the present invention, the next state of the received label may be generated by encrypting the received label with the public key of the respective index peer of the next peer.

With reference to FIG. 7B, in step 745, the peer privacy module 220 may be configured to reformat the received message with the next state of the label as the current label. In step 750, the peer privacy module 220 may transmit the reformatted message to the next peer. In step 755, the peer privacy module 220 may be configured to delete the selected entry from the hash table 225. Subsequently, the peer privacy module 220 may be configured to return to the idle state of step 705 (shown in FIG. 7A).

Figure 8:
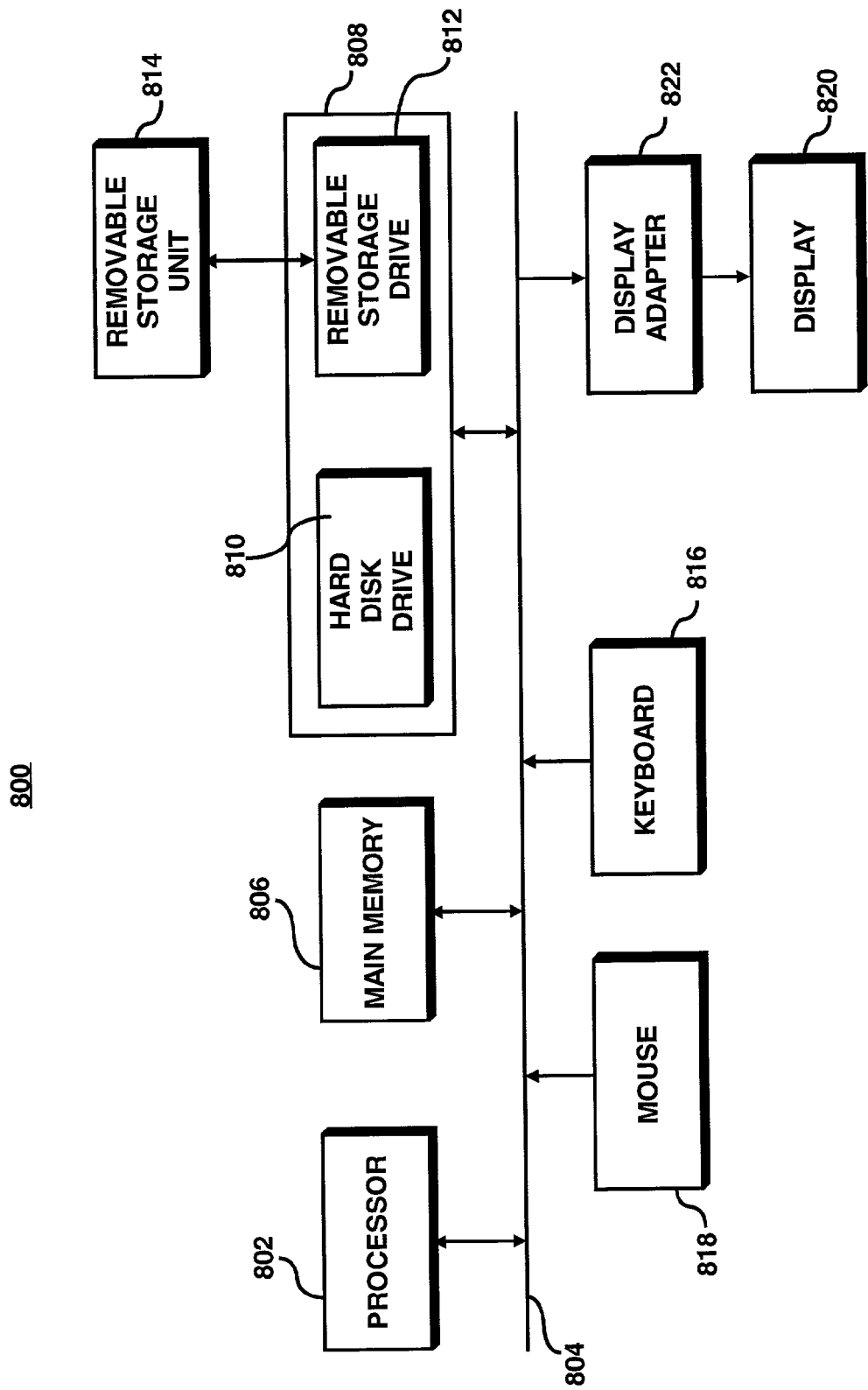
FIG. 8 illustrates an exemplary computer system where an embodiment of the present invention may be practiced.

FIG. 8 illustrates an exemplary block diagram of a computer system 800 where an embodiment of the present invention may be practiced. The functions of the peer privacy module may be implemented in program code and executed by the computer system 800. The peer privacy module may be implemented in computer languages such as PASCAL, C, C++, JAVA, etc.

As shown in FIG. 8, the computer system 800 includes one or more processors, such as processor 802, that provide an execution platform for embodiments of the peer privacy module. Commands and data from the processor 802 are communicated over a communication bus 804. The computer system 800 also includes a main memory 806, such as a Random Access Memory (RAM), where the software for the peer privacy module may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the peer privacy module may be stored. The removable storage drive 812 may read from and/or write to a removable storage unit 814 in a well-known manner. A user interfaces with the peer privacy module with a keyboard 816, a mouse 818, and a display 820. A display adaptor 822 interfaces with the communication bus 804 and the display 820 and receives display data from the processor 802 and converts the display data into display commands for the display 820.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for increasing peer privacy, comprising:
   forming a path from a provider to a requestor by selecting a plurality of peers in response to receiving a request for information;
   updating a table on each peer of said plurality of peers with a respective path index entry for said information;
   transmitting a message to said requestor through said plurality of peers, said message comprising said information and a path index for said information from said provider;
   determining a next peer according to said path for said information by searching said table of each peer of said plurality of peers with said path index as an index into said table;
   retrieving an identity of said next peer according to said path for said information and a respective index peer of said next peer;
   encrypting, by a processor, said path index with a public key of said respective index peer of said next peer to form a next state of said path index;
   and transmitting a new message with said information and said next state of said path index as said path index to said next peer.

2. The method according to claim 1, further comprising:
   receiving said request for information at a directory;
   determining an availability of said information; and
   notifying said requestor of a determination of non-availability.

3. The method according to claim 1, further comprising:
   receiving said request for information at a directory;
   determining an availability of said information; and
   generating an encryption key in response to a determination of said availability.

4. The method according to claim 3, further comprising:
   determining a first next peer from said provider and a respective index peer for said first next peer according to said path; and
   encrypting a reference to said information, said first next peer, and said respective index peer of said first next peer with said encryption key.

5. The method according to claim 4, wherein said encryption key is generated according to a DES encryption algorithm.

6. The method according to claim 4, further comprising:
   encrypting said encryption key with a public key of said requestor;
   encrypting said encryption key with a public key of said provider;
   forming a provider message, wherein said provider message comprises:
     said encryption key encrypted with said public key of said requestor;
     said encryption key encrypted with said public key of said provider;
     said encrypted reference; and
     said encrypted rust next peer and said respective lust index peer; and
   transmitting said message to said provider.

7. The method according to claim 1, further comprising:
   forming a respective path message to each peer of said plurality of peers, said respective path message comprising said respective path index entry.

8. The method according to claim 7, wherein said respective path index entry comprises an identity of a next peer according to said path, a respective index peer for said next peer, and an index entry.

9. The method according to claim 7, wherein said identity of next peer according to said path and said respective index peer for said next peer arc encrypted with a public key of a peer receiving said respective path message.

10. The method according to claim 7, wherein said index entry is formed according to $\{public_{b_{j_1}}(\ldots public_{b_{j_i}}(public_{b_{j_0}}(n))\ldots)\}$, where $b_j$ represents said respective index peer.

11. A method of transmitting information, comprising:
    updating a respective table of each peer of a plurality of peers with a respective path index entry in response to receiving a path formation message containing said respective path index entry;
    receiving a message comprising said information and a path index;

forwarding said information to a next peer in response to a determination of said next peer from said table with said path index as a search index into said table;

forming, by a processor, a next state of said path index by encrypting said path index with a public key of a respective index peer of said next peer;

forming a new message with said information and said next state of said path index as said path index; and transmitting said new message to said next peer.

12. The method according to claim 11, further comprising:

determining an availability of information in response to receiving a request for information from a requestor; and notifying said requestor of a determination of non-availability.

13. The method according to claim 11, further comprising:

determining an availability of information in response to receiving a request for information from a requestor; and forming a path through a plurality of peers with a provider as a beginning of said path to said requestor in response to a determination of availability.

14. The method according to claim 13, further comprising:

generating an encryption key;

determining a first next peer from said provider according to said path and a respective index peer to said first next peer;

encrypting a reference to said information, said first next peer and said respective index peer with said encryption key; and transmitting a retrieval message to said provider, said message comprises:

said encrypted reference;

said encrypted first next peer;

said encrypted respective index peer of said first next peer;

a value of a message counter for said information;

said encryption key encrypted with a public key of said provider; and said encryption key encrypted with a public key of said requestor.

15. The method according to claim 13, wherein said generation of said encryption key utilizes a DES encryption algorithm.

16. The method according to claim 13, further comprising:

receiving said second message at said provider;

applying a complementary key to said public key of said provider to said obtain said encryption key; and applying said encryption key to said encrypted reference to retrieve said reference.

17. The method according to claim 16, further comprising:

retrieving said information based on said decrypted reference;

encrypting said information with said encryption key;

forming said message, wherein said message comprises:

said encrypted information;

encryption key encrypted with a public key of said requestor; and said path index formed by encrypting said value of message counter with a public key of said respective index peer of said first next peer; and transmitting said message to said fast next peer according to said path.

18. The method according to claim 11, further comprising:

receiving said message at said requestor;

applying a complementary key to said public key of said requestor to said encryption key encrypted with said public key of said requestor to obtain said encryption key;

applying said encryption key to said encrypted reference to retrieve said information.

19. A method of increasing peer privacy, comprising:

selecting a path for information from a provider to a requestor through a plurality of peers in response to a received request for said information;

receiving a respective set-up message at each peer of said plurality of peers, wherein said respective set-up message comprises a predetermined label and an identity of a next peer for said information according to said path;

generating an encryption key;

encrypting said encryption key with a public key of said requestor;

encrypting, by a processor, said encryption key with a public key of said provider;

and encrypting a transaction identifier, a reference for said information, and a first next peer according to said path with said encryption key.

20. The method according to claim 19, further comprising:

updating a table with said predetermined label and said identity of a next peer for said information according to said path.

21. The method according to claim 20, further comprising:

receiving a message, wherein said message comprises:

said encryption key encrypted with a public key of said requestor;

said information encrypted with said encryption key; and a message label; and retrieving said identity of next peer from said table in response to said message label matching said predetermined label in said table.

22. The method according to claim 21, further comprising:

encrypting said label with a public key of said next peer;

reformatting said message with said label encrypted with said public key of said next peer as said label; and transmitting said message to said next peer.

23. The method according to claim 21, further comprising:

comparing said identity of said next peer with a current peer;

decrypting said encryption key encrypted with a public key of said requestor in response to said identity of said next peer being said current peer; and decrypting said information encrypted with said encryption key.

24. The method according to claim 19, further comprising:

forming a retrieval message comprising:

said encryption key encrypted with said public key of said requestor;

said encryption key encrypted with said public key of said provider;

said transaction identifier, said reference for said information, and said first next peer according to said path encrypted with said encryption key; and transmitting said retrieval message to said provider.

25. The method according to claim 24, further comprising:

applying a complementary key of said provider to said encryption key encrypted with said public key of said provider; and decrypting said reference for said information, said transaction identifier, and said first next peer.

26. The method according to claim 25, further comprising:

retrieving said information bused on said reference for said information;

encrypting said information with said encryption key; and forming a message label based on said transaction identifier.

27. The method according to claim 26, further comprising:
forming a message including said encrypted information and said message label; and
transmitting said message to said first next peer.

28. A method of increasing peer privacy, comprising:
forming a path for information from a provider to a requestor through a plurality of peers in response to a received request for said information;
transmitting, by a processor, to each peer of said plurality of peers a respective se-up message comprising of a predetermined label and an identity of a next peer for said information;
if a label stored at an intermediate peer of the plurality of peers does not match the predetermined label in the set-up message, the intermediate peer stores the predetermined label and the corresponding identity of the next peer;
if a label stored at the intermediate peer matches the predetermined label, the intermediate peer retrieves a previously stored message and generates a next state of the predetermined label for the setup message, wherein generating the next state comprises encrypting the received predetermined label with a public key of a respective index peer of the next peer; and
transferring said information over said path in a message by determining a next peer according to said path by matching a message label included in said message to said predetermined label.

29. The method of claim 28, wherein the stored message comprises:
an encryption key encrypted with the public key of the requestor.

* * * * *

UNITED STATES PATENT AND TRADEMARK OFFICE
CERTIFICATE OF CORRECTION

PATENT NO.         : 7,865,715 B2                                            Page 1 of 1
APPLICATION NO.    : 10/084499
DATED              : January 4, 2011
INVENTOR(S)        : Zhichen Xu et al.

It is certified that error appears in the above-identified patent and that said Letters Patent is hereby corrected as shown below:

In column 16, line 42, in Claim 6, delete "rust" and insert -- first --, therefor.

In column 16, line 42, in Claim 6, delete "lust" and insert -- first --, therefor.

In column 16, line 56, in Claim 9, delete "arc" and insert -- are --, therefor.

In column 17, line 60, in Claim 17, delete "fast" and insert -- first --, therefor.

In column 18, line 63, in Claim 26, delete "bused" and insert -- based --, therefor.

In column 19, line 10, in Claim 28, delete "se-up" and insert -- set-up --, therefor.

Signed and Sealed this
Twenty-fourth Day of May, 2011

David J. Kappos
*Director of the United States Patent and Trademark Office*